United States Patent [19]

Bradley et al.

[11] 4,002,099
[45] Jan. 11, 1977

[54] RIVET

[75] Inventors: William David Bradley; Keith Denham, both of Welwyn Garden City, England

[73] Assignee: Aerpat A.G., Zug, Switzerland

[22] Filed: Aug. 11, 1975

[21] Appl. No.: 603,656

[30] Foreign Application Priority Data

Aug. 16, 1974 United Kingdom ............ 36253/74

[52] U.S. Cl. .......................................... 85/74; 85/78
[51] Int. Cl.² .......................................... F16B 13/10
[58] Field of Search ............ 85/72, 73, 74, 67, 77, 85/78, 70, 75, 76

[56] References Cited

UNITED STATES PATENTS

| | | | |
|---|---|---|---|
| 1,052,237 | 2/1913 | Gebhardt | 85/77 |
| 1,164,322 | 12/1915 | Yeatman | 85/74 |
| 2,931,532 | 4/1960 | Gapp | 85/78 X |
| 3,244,801 | 4/1966 | Dozier | 85/77 |
| 3,267,205 | 8/1966 | Dozier | 85/72 X |
| 3,377,907 | 4/1968 | Hurd | 85/78 |
| 3,377,908 | 4/1968 | Stau et al. | 85/78 |
| 3,489,056 | 1/1970 | Blakeley | 85/78 |
| 3,521,521 | 7/1970 | King et al. | 85/78 X |
| 3,653,294 | 4/1972 | Nason | 85/77 X |
| 3,657,957 | 4/1972 | Siebol | 85/77 |

FOREIGN PATENTS OR APPLICATIONS

| | | | |
|---|---|---|---|
| 1,291,111 | 3/1962 | France | 85/78 |
| 1,228,781 | 4/1971 | United Kingdom | 85/78 |
| 1,152,578 | 5/1969 | United Kingdom | 85/74 |

*Primary Examiner*—Roy D. Frazier
*Assistant Examiner*—Thomas J. Holko
*Attorney, Agent, or Firm*—Oblon, Fisher, Spivak, McClelland & Maier

[57] ABSTRACT

In a blind self-plugging rivet of resilient nylon-66 material the stem head has an annular projecting barb adjacent the breakneck, and the shell has a short counterbore at its head end into which the barb expands, when the stem head is fully pulled into the shell, to assist in locking the stem head in the shell. At its tail end the shell bore has a plurality of annular faces arranged step-wise, to engage behind the end face of the stem head over a range of possible positions of the latter depending on the thickness of the riveted members.

14 Claims, 9 Drawing Figures

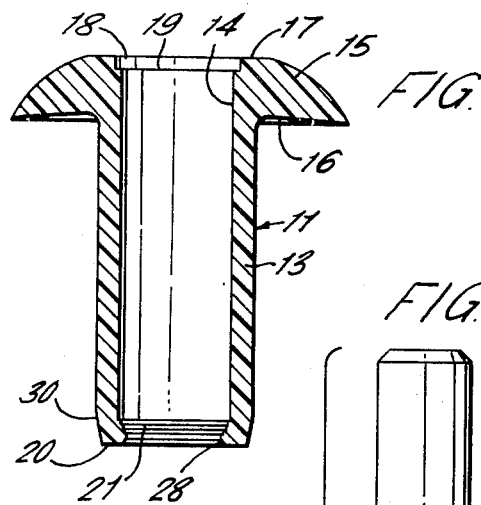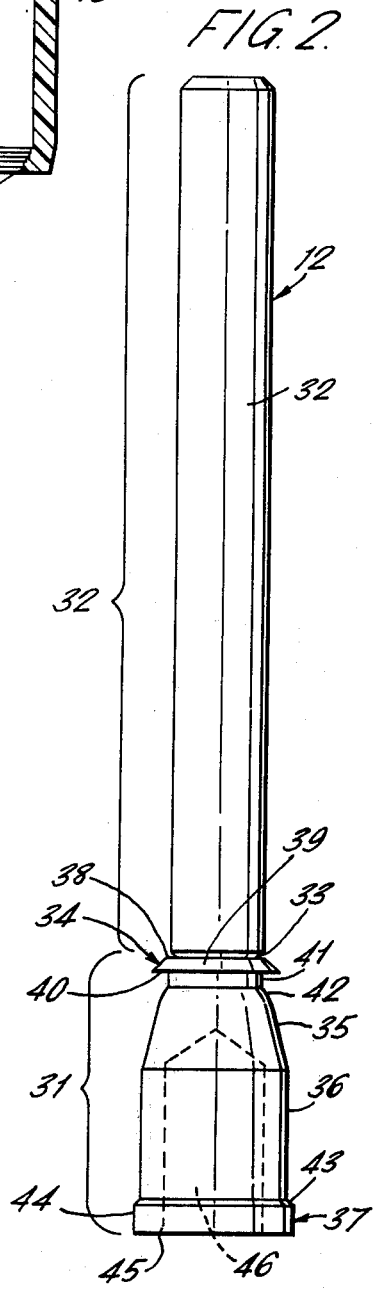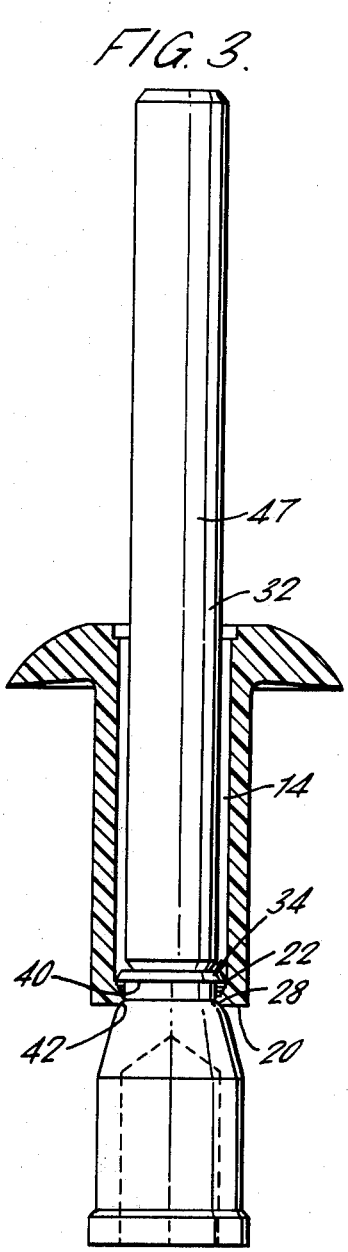

RIVET

The invention relates to a rivet and more particularly to a blind self-plugging rivet. In particular, it relates to a blind self-plugging rivet of the type comprising:

a tubular shell having an enlarged head at one end and having a bore extending completely through the shell;

and a stem extending through the tubular shell and having an enlarged head at one end;

whereby the stem head can be pulled into the tubular shell from the tail end of the shell to radially expand the shell at least at the tail end thereof to form a blind head, and thereafter the remainder of the stem can be broken off from the stem head to leave the stem head plugging the shell.

Such a blind self-plugging rivet is well known in the art of mechanical fasteners, and is hereinafter referred to as "a blind self-plugging rivet of the type defined".

It is an object of the invention to provide an improved blind self-plugging rivet of the type defined. Accordingly, the invention provides, in one of its aspects, a rivet of the type defined which rivet incorporates the improvement which comprises:

first and second engaging means positioned spaced apart along the shell bore;

and third and fourth engaging means positioned spaced apart along the stem head;

the second and third engaging means being adapted to be mutually engaged to hold the stem and shell assembled together before pulling of the stem head into the shell as aforesaid.

and the first and third engaging means being adapted to be mutually engaged, and the second and fourth engaging means being adapted to be mutually engaged, to assist in retaining the stem head plugging the shell after the stem has been pulled into the shell as aforesaid.

Preferably one or both of the first and second engaging means is located at or near an extremity of the shell bore. Preferably one or both of the third and fourth engaging means is located at or near a longitudinal extremity of the stem head.

The rivet may be such that, when the stem head is pulled into the shell bore as aforesaid, the stem elongates. In this case, the distance between the third and fourth engaging means is initially less than the distance between the first and second engaging means.

The first engaging means may be provided merely by the head and face of the shell around the head end of the shell bore, but in a preferred embodiment of the invention the first engaging means is provided by a short counterbore at the head end of the shell bore.

The third engaging means may comprise a radial projection on the stem head. Preferably this radial projection slopes outwardly away from the remainder of the stem e.g. it may be in the form of an annular barb.

The second and fourth engaging means are preferably such that there is a plurality of alternative different possible relative longitudinal positions in which they can be engaged together as aforesaid. This accomodates for different possible degrees of elongation of the stem head, which may depend, for example, on the total thickness (or "grip") of the workpieces in which the rivet is installed.

To this end, preferably at least one of the second and fourth engaging means defines a plurality of longitudinally separated positions with which the other of the engaging means can co-operate. For example, one of the second and fourth engaging means may comprise a plurality of annular faces arranged stepwise longitudinally of the rivet. In a preferred embodiment, the second engaging means comprises a plurality of annular steps.

The fourth engaging means may comprise the end face of the stem head. In a preferred embodiment, the stem head is provided with an annular enlargement adjacent that end face.

The stem head may be of a resilient material, preferably a synthetic resin material, e.g. nylon 66. In a preferred embodiment, the shell is of a similar material to the stem head.

A specific embodiment of the invention will now be described by way of example and with reference to the accompanying drawings, in which:

FIG. 1 shows the shell in longitudinal axial section;

FIG. 2 shows the stem in elevation;

FIG. 3 shows the assembled rivet, the shell being shown in axial longitudinal section and the stem being shown in side elevation;

Figure 4:
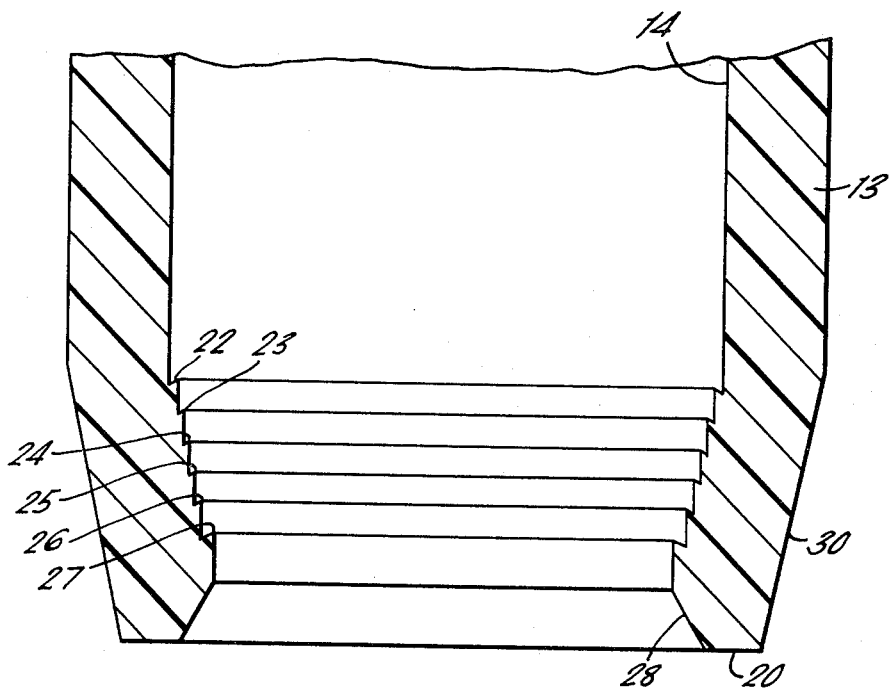
FIG. 4 shows, on an enlarged scale, the tail end of the rivet shell including the second engaging means.

The rivet of this example is made of nylon 66 and comprises generally two parts, a tubular shell 11 and a stem 12. The shell 11 comprises an elongated tubular body 13 having a bore 14 throughout its length and a radially enlarged head 15 at one end. The tubular body 13 is generally cylindrical but has an externally tapered tail portion 30 at the end remote from the head 15. The head 15 of the shell is of snap-head shape, and is slightly dished on the underhead surface as illustrated at 16. The head has a flat end face 17, into which opens a small counterbore 18 at the head end of the shell bore 14. The counterbore 18 and, in particular, its annular shoulder face 19 provides the first engaging means. The second engaging means 21 is provided internally of the tail portion of the shell body, and is shown in detail in FIG. 4. In this example, the second engaging means 21 is provided in form of six annular step-like shoulders 22, 23, 24, 25, 26, and 27. The shoulder 22 which is nearest the head end of the shell and extends to the full diameter of the bore 14 has the largest diameter, the diameters of successive shoulders decreasing towards the shell tail end face 20, so that the tailmost shoulder 27 is of the smallest diameter. As shown in FIG. 4, each shoulder has an annular face which faces towards the head end of the rivet shell, this annular face being not quite planar but being slightly frustoconical, the annular face sloping radially outwardly towards the tail end of the rivet shell. Beyond the smallest annular shoulder 27, a short tapering countersink 28 opens onto the tail end face 20 of the shell. The tail portion of the shell is that which includes the steps 22 . . . 27 internally and is externally tapered so that the thickness of the shell wall is substantially constant.

Reverting to FIG. 2, the rivet stem 12 comprises generally two portions, a head 31 which is formed integrally with the remainder or pintail 32 of the stem and is joined to the pintail by a breakneck 33 which is the weakest part of the stem. The pintail 32 is cylindrical in shape with a small bevel at each end, the one nearer the stem head 31 forming one side of the breakneck 33. The head 31 comprises, next to the breakneck 33, the third engaging means 34; a short section 41 of uniform diameter; an externally frustoconical tapering portion 35; then a main portion 36 of uniform external diameter, and finally the fourth engaging means in the form of a flange 37. The third engaging means 34 is in the form of a barb which comprises radial projection which has a flat annular front face 38 forming the other side of the breakneck 33, a short frustoconical face 39 which slopes radially outwardly away from the pintail, and a second flat annular back face 40 facing away from the pintail. The short cylindrical section 41 has a lesser diameter than the front flat annular face 38 but has a greater diameter than the breakneck 33. The narrow end of the adjacent tapering portion 35 is radiussed at 42 where it joins the head-most end of the uniform section 41.

The radial flange 37 which constitutes the fourth engaging means is located at the remote end of the head and comprises a short frustoconical face 43 the narrower end of which meets the uniform main portion 36, a cylindrical peripheral surface 44, and the annular end face 45 of the head 31. The end face 45 is annular because the head 31 has a counterbore. The diameter of the counterbore 46 is about two thirds of the diameter of the uniform part 36 of the head, and extends from end face 45 of the head towards the pintail as far as the nearer half of the tapering portion 35.

The stem and shell are assembled together as illustrated in FIG. 3. The major diameter of the annular barb 34 is slightly greater than the internal diameter of the bore 14, and the axial distance between the back face 40 of the barb and the radiussed part 42 at the smaller end of the head taper 35 is slightly less than the axial distance between the shell tail and countersink 28 and the farthest annular step shoulder 22. The stem and shell are assembled together by inserting the tail end of the pintail 32 through the bore 14 from the shell tail end 20 and applying sufficient thrust to resiliently deflect the annular barb 34 inwards and backwards so that the barb passes through the restricted tail end and into the bore. The radius 42 on the stem head then seats against the shell tail countersink 28 and the back face 40 of the barb 34 seats behind the largest annular step shoulder 22 in the shell tail. Thus the stem and shell are held together by the second and third engaging means being mutually engaged. The external taper of the shell tail 30 ensures that, if the shell tail is expanded by the interaction of the second and third engaging means, its exterior dimensions do not exceed the original external diameter of the major portion of the rivet shank. Since the pintail 32 is longer than the length of the shell 11, a substantial length of the pintail projects beyond the shell head to form a gripping portion 47.

The self-plugging rivet of this example is used in the conventional manner to join together two or more apertured sheets, by inserting the stem head 31 and the shell body 13 through two superimposed holes of the sheets, the holes being of a diameter slightly larger than the shell body 13, until the underface of the shell head abuts the nearer face of the nearer sheet. Tension is then applied to the projecting gripping portion 47 of the pintail to pull the head of the stem towards the shell head 15. This is done by means of a suitable pulling tool having an annular anvil for abutting the shell head 15, jaws or other gripping means to grip the portion 47 of the pintail, and pulling means for pulling the jaws with respect to the anvil. Such tools are well known in relation to conventional self-plugging rivets.

Figure 5:
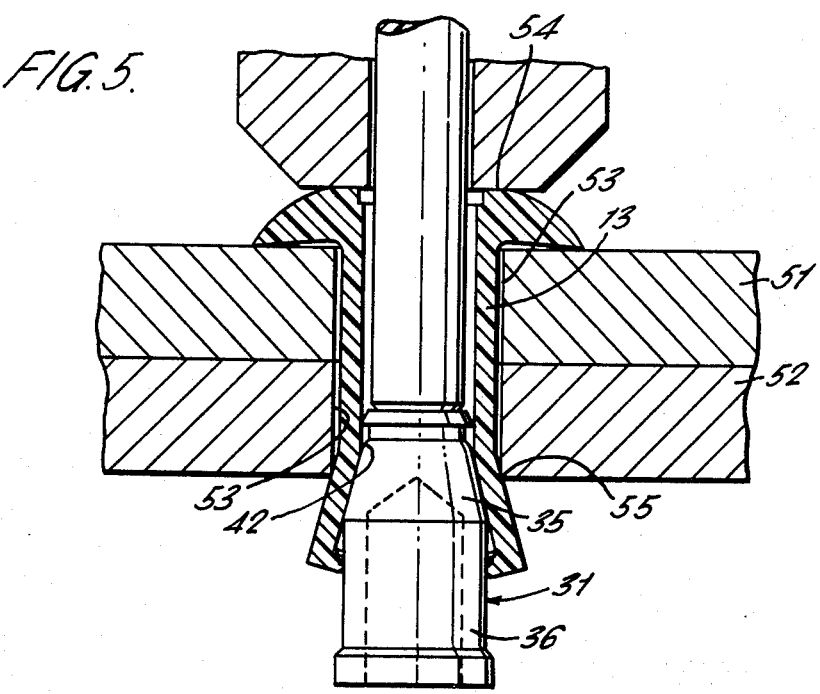
FIG. 5 to 8 are similar to FIG. 3 and show respectively successive stages in the placing of the rivet in a workpiece.

FIG. 5 shows an early stage in the placing of the rivet to join together two panels 51, 52 which have registering holes 53 of slightly larger diameter than the rivet shell. The annular anvil 54 of the pulling tool is indicated but the jaws and pulling means are not shown. In the stage reached in FIG. 5, it will be seen that the stem head 31 has started to enter the tail end of the shell 13, the tapering portion 35 of the stem head having expanded the tail portion of the shell sufficiently far that the shell has just contacted the rear face of the rear sheet 52 around the adjacent end 55 of the hole 53. The uniform portion 36 of the stem head 31 has entered into the tail end of the shell, which has expanded radially outwards to accomodate it. It will be seen that some distortion of the stem head has occurred, the radius 42 at the narrow end of the tapering portion 35 having been deformed and slightly flattened.

Figure 6:
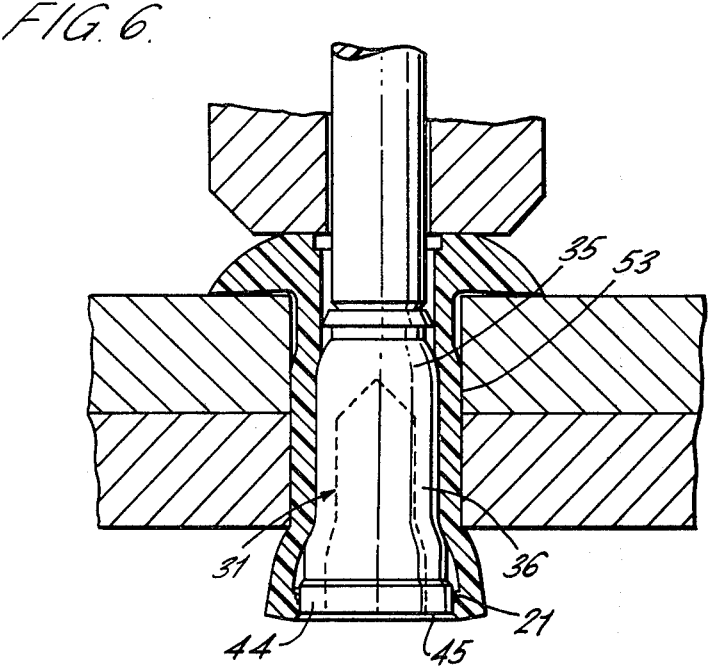

FIG. 6 shows a later stage in the entry of the stem head into the shell. The end flange 37 on the stem head is now opposite the steps of the second engaging means 21 inside the tail end of the shell, and the end face 45 of the stem is just inside the tail portion of the shell. The stem head 31 has caused the shell to be radially expanded over about two thirds of the length within the sheets, and the stem head has been substantially deformed. This deformation consists of a reduction in the diameter of the uniform main portion 36 and of a major part of the tapering portion 35 of the head, so that, as seen in FIG. 4, the difference between the two parts 35 and 36 is no longer distinct. The deformation also includes an elongation of the stem head 31 due both to the reduction in diameter because of the radially inwards reaction of the shell constrained by the walls of the holes 53, and also due to the tension on the head as a result of the pulling of the pintail and the resistance to the motion of the stem head through the shell which occurs very largely at the position level with the rear end 55 of the hole 53 where the constraint to radial expansion of the shell first occurs.

Figure 7:
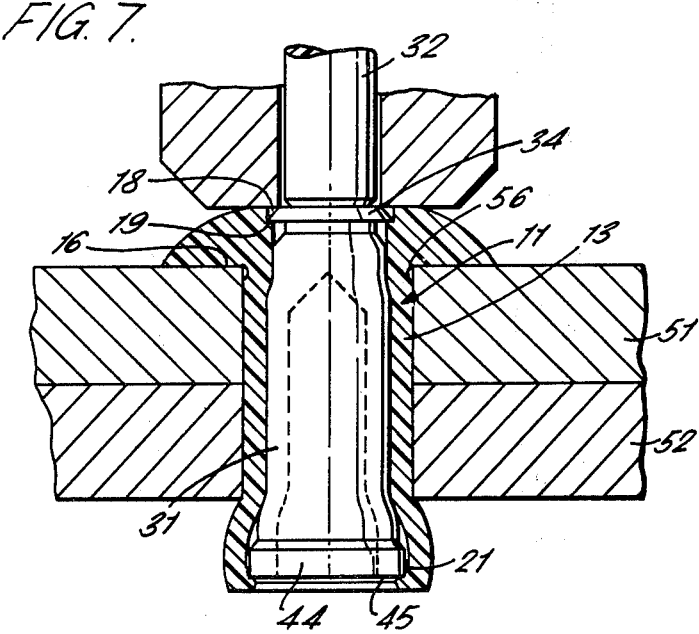

FIG. 7 shows the stem head 31 fully drawn into the shell 11. The annular barb 34 which has a natural diameter greater than that of the shell bore, has resiliently expanded to engage with the annular shoulder face 19 of the counterbore 18 in the shell head. Thus the first and third engaging means are mutually engaged. The flange 37 on the remote end of the stem head has entered further into the tail portion of the shell than it had at the stage illustrated in FIG. 4, and the annular end face 45 of the stem head has locked behind one of the annular steps 22 . . . 27 which is nearer the tail end of the shell. Thus the second and fourth engaging means are interengaged to assist in retaining the stem head in the shell. The stem head has elongated even more than was the case in the stage illustrated in FIG. 6, and a comparison of the length of the head in FIG. 3 and FIG. 7 will illustrate the extent of this elongation. The tubular body 13 of the shell has been radially expanded over substantially the whole length within the sheets 51, 52 except for a very small portion at 56 immediately adjacent to the shell head 15 and the front face of the panel 51. The under face 16 of the shell head has been distorted so that this is now flat and in contact with the front face of the sheet 51 over substantially all its area, instead of being dished as it was originally. The annular front face 38 of the barb 34 may, as shown in FIG. 7, contact the front end face of the anvil 54, provided that the tension required to produce this elongation of the stem head is not greater than the breaking tension of the breakneck. Whether or not this happens, the increasing tension applied to the pintail causes the stem to break at the breakneck 33.

Figure 8:
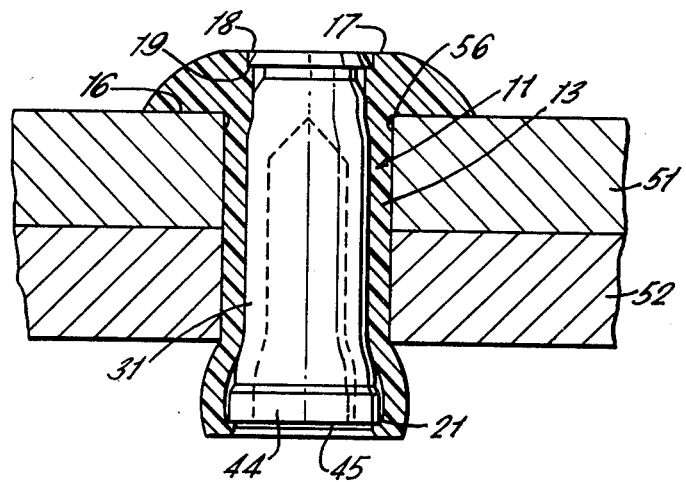

FIG. 8 illustrates the placed rivet after the pintail has been broken off at the breakneck 33 by increased tension applied by the tool, the condition of the shell and the head which plugs it being the same as in FIG. 7. It will be noted that the broken surface of the stem is level with the end face 17 of the shell head, which is the so-called "flush-break" condition sought after in commercial use.

Figure 9:
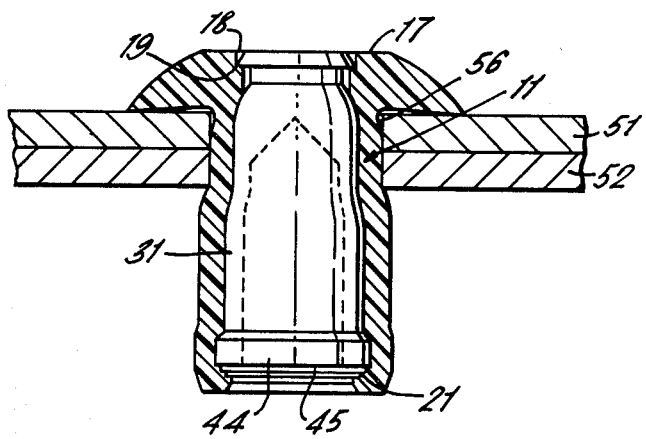
FIG. 9 is similar to FIG. 8 and shows a similar rivet placed in a thinner workpiece.

FIG. 9 is similar to FIG. 8 but illustrates a similar rivet placed in sheets of very much smaller total thickness or "grip", equal to about one third of the grip shown in FIGS. 5 to 8. It will be seen that the form of the placed rivet is in general very similar, except that of course a much greater length of the rivet body extends beyond the sheets and is of larger diameter than the hole through the sheets. The end face 45 of the stem head has locked behind one of the annular steps 22 . . . 27 which is nearer the shell head than was the case in the thicker sheets.

Thus the same size of rivet can operate successfully over a grip range of ratio about 3 to 1. The head of the stem is securely held in the shell at both ends, and is secured against relative movement out of the shell in both directions.

The invention is not restricted to the details of the foregoing example.

We claim:

1. A blind self-plugging rivet comprising a stem and a tubular shell, said shell having an enlarged head at one end, a tail portion remote from the head and a bore extending completely through the shell, the bore in said tail portion having a step wise reduction in diameter in a direction away from the head; said stem extending through the bore of the tubular shell and having an enlarged head at one end; whereby the stem head can be pulled into the tail end of the bore of the tubular shell in a direction towards the head of the shell to radially expand the shell at least at the tail end thereof to form a blind head, and thereafter the remainder of the stem can be broken off from the stem head to leave the stem head plugging the shell, said shell having first and second engaging means positioned spaced apart along the shell bore, said second engaging means being provided by said step wise reduction in the tail portion; and third and fourth engaging means positioned spaced apart along the stem head; the said second and third engaging means being adapted to be mutually engaged to hold the stem and shell assembled together before pulling of the stem head into the shell as aforesaid, and the said first and third engaging means being adapted to be mutually engaged, and the said second and fourth engaging means being adapted to be mutually engaged, to assist in retaining the stem head plugging the shell after the stem has been pulled into the shell as aforesaid.

2. A blind self-plugging rivet as claimed in claim 1, in which one of said first and second engaging means is located at or near one extremity of the shell bore.

3. A blind self-plugging rivet as claimed in claim 2, in which the other of the said first and second engaging means is located at or near the other extremity of the shell bore.

4. A blind self-plugging rivet as claimed in claim 1, in which one of the said third and fourth engaging means is located at or near one longitudinal extremity of the stem head.

5. A blind self-plugging rivet as claimed in claim 4, in which the other of the said third and fourth engaging means is located at or near the other longitudinal end of the stem head.

6. A blind self-plugging rivet as claimed in claim 1, in which the stem head is of a resilient, deformable material and elongates when the stem head is pulled into the shell bore and in which the distance between the third and fourth engaging means is initially less than the distance between the first and second engaging means.

7. A blind self-plugging rivet as claimed in claim 1, in which the first engaging means comprises a shoulder provided by a short counterbore at the head end of the shell bore.

8. A blind self-plugging rivet as claimed in claim 1, in which the third engaging means comprises a radial projection on the stem head.

9. A blind self-plugging rivet as claimed in claim 8, in which the said radial projection slopes outwardly away from the remainder of the stem.

10. A blind self-plugging rivet as claimed in claim 8, in which the said third engaging means comprises an annular barb.

11. A blind self-plugging rivet as claimed in claim 1, in which the stem head is provided with an annular enlargement adjacent the end face of the stem head.

12. A blind self-plugging rivet as claimed in claim 1, in which said second engaging means comprises a plurality of annular shoulders arranged stepwise longitudinally of the tail portion of the shell.

13. A blind self-plugging rivet as claimed in claim 12, in which the annular shoulders slope outwardly towards the tail end of the rivet.

14. A blind self-plugging rivet as claimed in claim 1, in which the tail portion is tapered externally away from the head of the shell.

* * * * *